(No Model.) 2 Sheets—Sheet 1.
A. WENZEL.
MACHINE FOR CUTTING POLYGONAL OBJECTS.
No. 245,107. Patented Aug. 2, 1881.
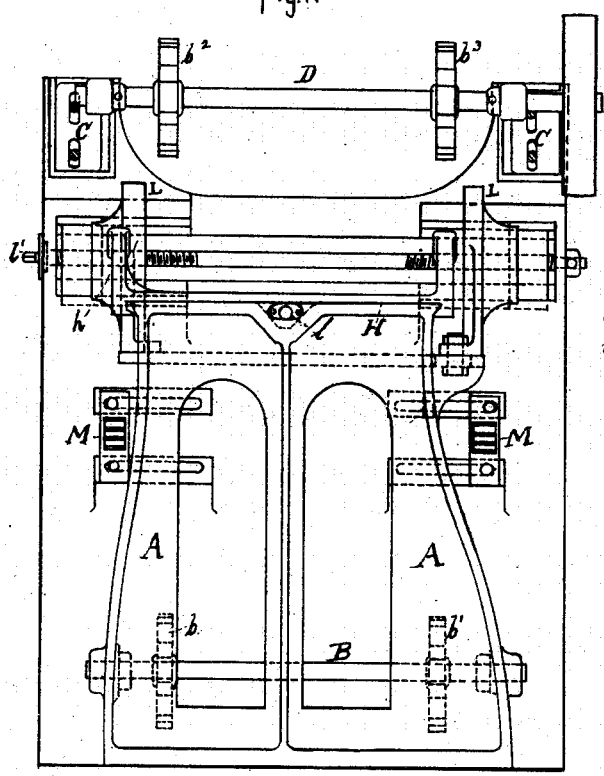
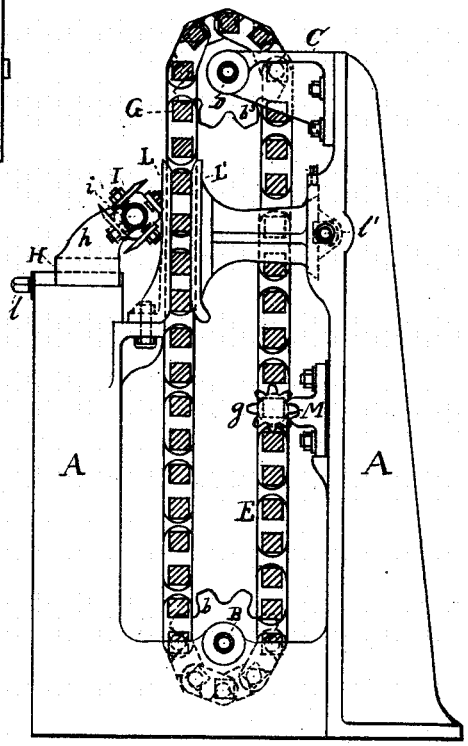
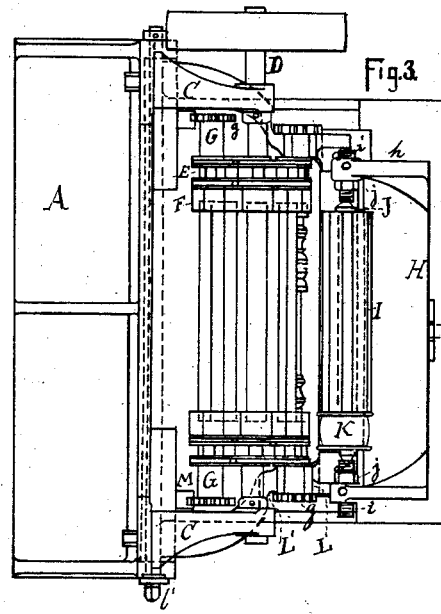
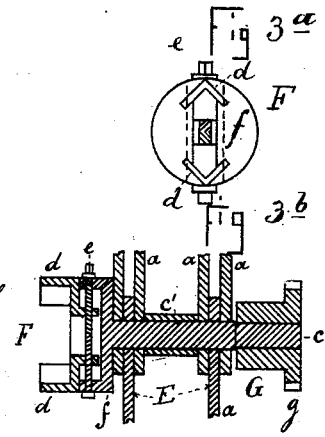
WITNESSES—
F. W. Kasehagen.
Thos. M. Marble.
INVENTOR—
Alexander Wenzel
By Wm. H. Lotz
Attorney (No Model.) 2 Sheets—Sheet 2.
A. WENZEL.
MACHINE FOR CUTTING POLYGONAL OBJECTS.
No. 245,107. Patented Aug. 2, 1881.
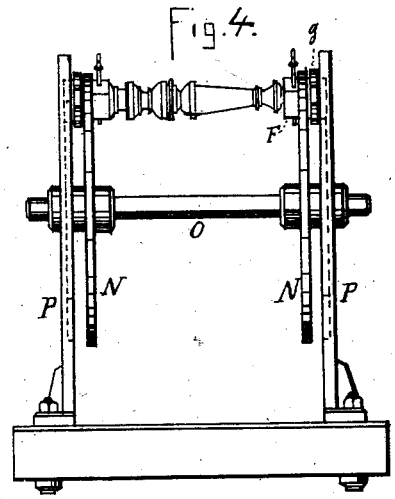
Fig. 4.
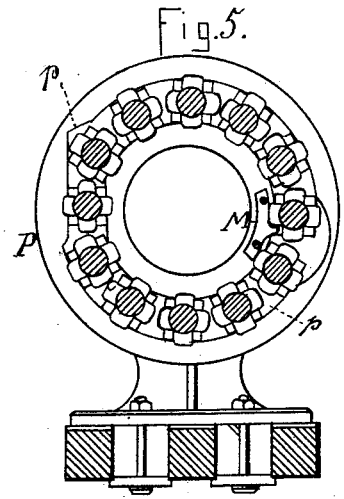
Fig. 5.
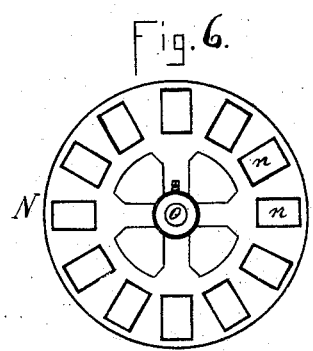
Fig. 6.
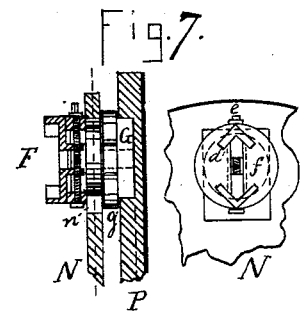
Fig. 7.
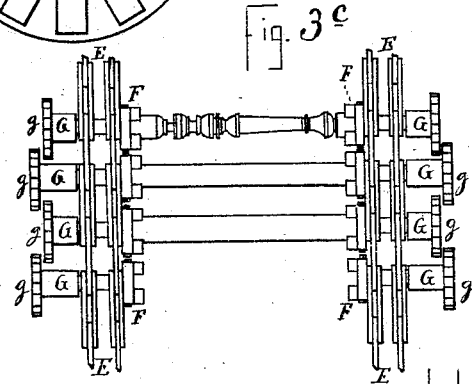
Fig. 3ᶜ
WITNESSES —
F. W. Kasehagen
Oliver W. Marble
INVENTOR —
Alexander Wenzel
By Wm. H. Lotz
Attorney

UNITED STATES PATENT OFFICE.

ALEXANDER WENZEL, OF BERLIN, ASSIGNOR TO EDUARD BAHN, OF CHARLOTTENBURG, PRUSSIA, GERMANY.

MACHINE FOR CUTTING POLYGONAL OBJECTS.

SPECIFICATION forming part of Letters Patent No. 245,107, dated August 2, 1881.

Application filed June 6, 1881. (No model.)

*To all whom it may concern:*

Be it known that I, ALEXANDER WENZEL, of Berlin, in the Kingdom of Prussia and Empire of Germany, have invented a certain new and useful Improvement in Machines for Cutting Polygonal Objects, of which the following is a specification.

This machine is for the purpose of manufacturing flat-sided objects of an ornamental shape, such as polygonal balusters; and it is my intention to produce a machine that will automatically and in one successive operation shape the several sides of a series of balusters without requiring a readjustment of the same after the blanks out of which said balusters are to be formed have once been secured into the machine.

My invention consists of two endless chains arranged parallel with each other and moving at a uniform speed. These chains carry a series of clamps pivotally secured thereto, and between each pair of such clamps is secured a blank which is to be shaped as a baluster. These clamps have polygonal former-blocks attached, which have as many parallel sides as the object to be cut is to have. The former-blocks move between guides arranged opposite to a rotating cutter-head which will hold the clamps steady while one side of the blank is being planed or shaped by the cutter-knives. Each clamp also has a small toothed wheel attached, which, with each complete revolution of the chains, will be brought in gear with one or more fixed teeth that will turn the clamp and the blank therein a certain fraction of a revolution, sufficient to move the next face of the object to be cut in contact with the cutter-knives. This operation continues until the chains have made as many revolutions as the objects to be cut are to have sides, when all of the objects are ready and can be replaced by blanks again.

In the accompanying drawings, forming part hereof, Figure 1 represents a front elevation of the machine; Fig. 2, an end view, and Fig. 3 a plan, of the same. Fig. 3ª represents a front elevation of the blank-clamp, and Fig. 3ᵇ is a section through the blank-clamp chain, former-block, and pinions. Fig. 3ᶜ represents a vertical longitudinal sectional view, showing the face of the carrying mechanism. Fig. 4 represents a front view of a modified form of the machine; Fig. 5, a sectional end view of the same; Fig. 6, an elevation of one of the slotted disks of said modified machine; Fig. 7, a section and elevation of one of the blank-clamps.

Like letters denote corresponding parts in all the figures.

A denotes a U-shaped frame. Upon the base of this frame, in proper bearings, is journaled a shaft, B, and to the top of the higher standards of the same are secured two bracket-bearings, C, in which is journaled a shaft, D. Upon both shafts B and D are mounted sprocket-wheels $b$ $b'$ $b^2$ $b^3$, and secured by keys so as to be laterally adjustable thereon for the purpose of enabling the setting of these wheels closer together or farther apart. Over each pair of these sprocket-wheels is stretched an endless double chain, E, composed of two sets of iron links, $a$, pivotally connected by turned spindles $c$. Upon these spindles are placed sleeves $c'$, for keeping the chains apart, which match the spaces between the teeth of the sprocket-wheels. Bracket-bearings C are vertically adjustable for taking up any slack of the chains.

F F are clamps, each composed of a plate, $f$, which is rigid with one of the spindles $c$, and has a dovetailed groove. Two rectangular jaws, $d$, are fitted into this dovetailed groove, and are moved toward or away from each other by a screw, $e$, having upon its opposite ends right and left threads.

Upon the opposite projecting ends of the spindles $c$ are sleeved former-block G and small gear-wheels $g$. Both former-block and pinion are preferably made in one piece, and these are removably secured upon the end of each spindle by a key. In the drawings these former-blocks are shown to be square, as required for cutting square objects; but when hexagon or octagon objects are to be cut the square former-blocks are then removed and exchanged for others having the desired shape. For the purpose that the gear-wheels $g$ of adjacent clamps will clear each other, I make every other one or half of all the former-blocks G longer, so as to shift the gear-wheel farther away from the chain.

H is a plate having two curved standards, h, with eye-hubs at their upper extremities. Through these eye-hubs are passed two screws, i, having female centers, each to be adjusted by a nut, j.

I is the cutter-head, mounted upon a spindle, J, having pointed ends, which find a bearing in the female centers of the screws i. Upon this cutter-head I are secured four knives or cutters, the cutting-edges of which are to have the ornamental outline of the object to be shaped. A flanged belt-pulley, K, is also mounted upon the spindle, by which it is driven.

The plate H is secured to the lower standard of the frame A in dovetails, so as have a horizontal-sliding movement thereon, and is arranged to be laterally adjustable by a screw, l.

L L are vertical guide-plates, secured upon brackets of the frame A by screws passed through slots in the bracket and through the flanges of the guides, so as to allow the guide-plate to be laterally adjustable.

L' L' are similar vertical guide-plates, the heel-plates of which are secured to the frame in a dovetailed groove, so as to slide therein, and to be laterally adjustable by a long screw, l', having right and left screw-threads on its opposite ends, and moving both guides simultaneously toward or away from each other. These guides are placed opposite to the cutter-head and parallel with each other, and such a distance apart that the former-blocks G will have just room to pass between, thereby holding the same steady during their passage, and also holding the blanks steady while one side is planed off by the cutters.

M M are short racks with which the gear-wheels g while passing will engage and will have imparted to them a fraction of a revolution equal to the angular degrees required for the former-blocks to present the next faces to the guides. These racks are secured to the frame in a manner to be laterally adjustable and have a wide enough face to engage with the several gear-wheels placed at varying distances from the carrying-chains.

As will be noticed, the two endless chains in this machine form a continuous table for carrying the blanks, and said blanks, by means of the former-blocks, gear-wheels, and racks, present in succession each side to be planed, thus making the operation automatically continuous until the object to be shaped is completed, thereby saving the time and trouble of readjustment with the completion of every single side during the process of manufacture.

Figures 4, 5, 6, and 7 show a machine that operates on the same principle, excepting that in place of the double chains two disks, N, which are mounted upon a shaft, O, are provided, the clamps F being secured to sliding disks or collars which have a radially-sliding movement in the slots n of said disks. In this machine the blocks G are mounted upon the extreme ends of spindles c, and are guided in concentric grooves p of two stationary ring-plates, P. This groove p is not concentric around the whole circle, but follows a vertical straight line where the blank is to pass the cutter-head. The gear-wheels g for turning the blanks occupy the space between the disk N and the former-block G, and engage with a rack or tooth, M, secured to the stationary ring-plate P, and at the point where the turning of the blank is to take place the groove p is enlarged for the former-block to rotate.

What I claim as my invention is—

1. In a machine for the purpose described, the combination of the endless chains E E, pivotally connected by turned spindles c, pivotal clamps F, rigid with said spindles c, sleeved former-blocks G, removably secured upon the ends of the spindles c, laterally-adjustable guide-plates L L', secured to brackets on the frame to guide the former-blocks during their passage between said plates, and the cutter-head I, all constructed and arranged substantially as described and shown.

2. In a machine for the purpose described, the combination, with the cutter-head I, of the pivotal clamps F, with gear-wheels g and former-blocks G, arranged to slide between proper guides, and of short racks M, for bringing about a partial rotation of the clamps, all constructed in the manner set forth.

3. In a machine for the purpose described, the combination, with a rotating cutter-head, I, of the endless chains E E, the pivotal clamps F, having former-blocks G and gear-wheels g, guide-plates L L', and racks M, the same being constructed and arranged to operate substantially in the manner described and shown.

In testimony whereof I have signed my name to this specification in the presence of two subscribing witnesses.

ALEXANDER WENZEL.

Witnesses:
BERTHOLD ROI,
CARL NEUER.